(12) United States Patent
Gelinas et al.

(10) Patent No.: US 9,047,093 B2
(45) Date of Patent: Jun. 2, 2015

(54) DATA TRANSFER BUS COMMUNICATION TO RECEIVE DATA BY SENDING REQUEST INSTRUCTION ATTACHED WITH IDENTIFIER INDICATING PROCESSOR AND THREAD CONTEXT IDENTITIES

(75) Inventors: Robert Gelinas, Needham, MA (US); W. Patrick Hays, Cambridge, MA (US); Sol Katzman, Waltham, MA (US); William J. Dally, Stanford, CA (US)

(73) Assignee: ARM Finance Overseas Limited, Cambridge (GB)

( * ) Notice: Subject to any disclaimer, the term of this patent is extended or adjusted under 35 U.S.C. 154(b) by 1273 days.

(21) Appl. No.: 12/429,655

(22) Filed: Apr. 24, 2009

(65) Prior Publication Data

US 2009/0210682 A1 Aug. 20, 2009

Related U.S. Application Data

(60) Continuation of application No. 11/552,640, filed on Oct. 25, 2006, now Pat. No. 7,529,915, which is a division of application No. 09/591,510, filed on Jun. 12, 2000, now Pat. No. 7,162,615.

(51) Int. Cl.
*G06F 9/46* (2006.01)
*G06F 9/312* (2006.01)
*G06F 9/38* (2006.01)
*G06F 9/30* (2006.01)

(52) U.S. Cl.
CPC ............ *G06F 9/3851* (2013.01); *G06F 9/3004* (2013.01); *G06F 9/30101* (2013.01); *G06F 9/30123* (2013.01)

(58) Field of Classification Search
None
See application file for complete search history.

(56) References Cited

U.S. PATENT DOCUMENTS

| | | | |
|---|---|---|---|
| 5,008,812 A | 4/1991 | Bhandarkar et al. | |
| 5,197,138 A | 3/1993 | Hobbs et al. | |
| 5,345,588 A | 9/1994 | Greenwood et al. | |
| 5,353,418 A * | 10/1994 | Nikhil et al. | 718/108 |
| 5,361,334 A | 11/1994 | Cawley | |
| 5,386,563 A | 1/1995 | Thomas | |
| 5,390,332 A | 2/1995 | Golson | |
| 5,421,014 A | 5/1995 | Bucher | |
| 5,488,716 A | 1/1996 | Schneider et al. | |
| 5,493,687 A | 2/1996 | Garg et al. | |
| 5,506,987 A | 4/1996 | Abramson et al. | |
| 5,524,250 A | 6/1996 | Chesson et al. | |
| 5,535,397 A | 7/1996 | Durante et al. | |
| 5,649,229 A * | 7/1997 | Matsuzaki et al. | 712/24 |
| 5,649,230 A | 7/1997 | Lentz | |
| 5,696,956 A | 12/1997 | Razdan et al. | |
| 5,701,493 A | 12/1997 | Jaggar | |
| 5,758,112 A | 5/1998 | Yeager et al. | |

(Continued)

OTHER PUBLICATIONS

Class-IC Data Sheet; MOSAID Semiconductors; 1999, 2 pages.

(Continued)

*Primary Examiner* — Kenneth Kim
(74) *Attorney, Agent, or Firm* — Patterson Thuente Pedersen, P.A.

(57) ABSTRACT

Systems and methods for managing context switches among threads in a processing system. A processor may perform a context switch between threads using separate context registers. A context switch allows a processor to switch from processing a thread that is waiting for data to one that is ready for additional processing. The processor includes control registers with entries which may indicate that an associated context is waiting for data from an external source.

25 Claims, 6 Drawing Sheets

(56) References Cited

U.S. PATENT DOCUMENTS

| | | |
|---|---|---|
| 5,761,506 A | 6/1998 | Angle et al. |
| 5,764,885 A | 6/1998 | Sites et al. |
| 5,802,272 A | 9/1998 | Sites et al. |
| 5,860,003 A | 1/1999 | Eidler et al. |
| 5,900,025 A | 5/1999 | Sollars |
| 5,926,646 A | 7/1999 | Pickett et al. |
| 5,933,627 A | 8/1999 | Parady |
| 6,026,475 A | 2/2000 | Woodman |
| 6,182,183 B1 | 1/2001 | Wingard et al. |
| 6,216,220 B1 | 4/2001 | Hwang |
| 6,223,208 B1 | 4/2001 | Kiefer et al. |
| 6,269,425 B1 | 7/2001 | Mounes-Toussi et al. |
| 6,292,888 B1 | 9/2001 | Nemirovsky et al. |
| 6,378,065 B1 | 4/2002 | Arnold et al. |
| 6,389,449 B1 | 5/2002 | Nemirovsky et al. |
| 6,442,585 B1 * | 8/2002 | Dean et al. .............. 718/108 |
| 6,477,562 B2 | 11/2002 | Nemirovsky et al. |
| 6,535,905 B1 | 3/2003 | Kalafatis et al. |
| 6,567,839 B1 | 5/2003 | Borkenhagen et al. |
| 6,789,100 B2 | 9/2004 | Nemirovsky et al. |
| 7,020,879 B1 | 3/2006 | Nemirovsky et al. |
| 7,058,064 B2 | 6/2006 | Nemirovsky et al. |
| 7,082,519 B2 | 7/2006 | Kelsey et al. |
| 7,120,783 B2 | 10/2006 | Fotland et al. |
| 7,162,615 B1 | 1/2007 | Gelinas et al. |

OTHER PUBLICATIONS

Hehr, Ron; UTCAM-ENGINE™ Accelerates Large Table Look-up Applications; 1999; 28 pages; UTMC Microelectronic Systems; Colorado Springs, CO.

Rabaey et al.; "Challenges and Opportunities in Broadband and Wireless Communication Designs"; Proc. of the 2000 IEEE/ACM Int'l Conf. on CAD, Nov. 2000, pp. 76-82, San Jose, CA.

Product Brief; C-5 Digital Communications Processor; 1999-2000; 8 pages; C-Port Corporation, North Andover, MA 01845.

* cited by examiner

DATA TRANSFER BUS COMMUNICATION TO RECEIVE DATA BY SENDING REQUEST INSTRUCTION ATTACHED WITH IDENTIFIER INDICATING PROCESSOR AND THREAD CONTEXT IDENTITIES

CROSS-REFERENCE TO RELATED APPLICATIONS

This application is a continuation of U.S. application Ser. No. 11/552,640, filed Oct. 25, 2006, which is a divisional of U.S. application Ser. No. 09/591,510, filed Jun. 12, 2000, now U.S. Pat. No. 7,162,615. U.S. application Ser. No. 11/552,640 is incorporated herein in its entirety by reference.

BACKGROUND OF THE INVENTION

This invention relates generally to the field of network communication processors, and more specifically to the field of system device instructions and context switching.

Network communication systems demand real-time performance. The performance of conventional processors in network communication systems is degraded by long latency accesses, especially to shared resources. For example, in order to look up data in a table lookup unit, a processor must send an operation with data to the table lookup unit (TLU) commanding the TLU to look up data in a table. After performing the lookup operation, the TLU stores the resulting data internally. The processor sends a load command requesting that the TLU load the result on the bus and return the data to the processor. This procedure requires two bus transactions initiated by the processor. Therefore, it would be desirable to have a single transaction both command the device to perform an operation and provide the result to the processor.

Another latency problem is that some conventional processors will await receipt of the result of the look up before processing other instructions. One way of dealing with this problem is to perform instructions in a different thread while a first thread awaits data. This is called a context switch. Context switches performed in software, store all data in the processor registers in memory and then use the processor registers for a new context. This requirement to store and restore data using a single set of registers wastes processor cycles. Therefore, it would be desirable to have a context switch performed that does not waste processor cycles.

SUMMARY OF THE INVENTION

Systems and methods consistent with the present invention allow for performing a single transaction that supplies data to a device and commands the device to perform an action and return the result to a processor.

In addition, systems and methods consistent with the present invention further allow for performing a context switch with no stall cycles by using an independent set of registers for each context.

A processing system consistent with the present invention includes a processor configured to formulate an instruction and data for sending to a device. The formulated instruction requests that the device perform a command and return data to the processor. A bus controller is configured to generate a system bus operation to send the formulated instruction and data along with a thread identifier to the device.

A processor consistent with the present invention executes instructions in threads. The processor includes a context register file having a separate set of general registers for a plurality of contexts, where the threads are each assigned a separate context, and context control registers having a separate set of control registers for the plurality of contexts.

Another processing system consistent with the present invention includes a processor configured to formulate an instruction and data, from a thread associated with a first context, for sending to a device, the instruction requesting the device to perform a command and return data to the processor, and perform a context switch to switch from processing the first context to a second context. A bus controller is configured to generate a system bus operation to send the formulated instruction and data along with a thread identifier to the device.

A method consistent with the present invention processes a single instruction that both requests a system device operation and requests the system device return data, the method comprising the steps of fetching an instruction from memory, forming a descriptor, constructing a system bus address, initiating a system bus operation to request a device to perform an operation and return data to a processor identified in a thread identifier, and retrieving return data from a system bus based on the thread identifier provided with the returned data.

Another method consistent with the present invention switches between contexts using a processor having a context register file having a separate set of general registers for a plurality of contexts, each set of registers being associated with a thread, and context control registers having a separate set of control registers for the plurality of contexts, the method comprising the steps of receiving a context switch instruction, receiving an identifier of a next context to activate from the scheduler, performing a next instruction in a current context, and pointing a processor program counter to the context program counter in the context control register associated with the next context.

BRIEF DESCRIPTION OF THE DRAWINGS

The accompanying drawings, which are incorporated in and constitute a part of this specification, illustrate one embodiment of the invention and, together with the description, serve to explain the objects, advantages, and principles of the invention. In the drawings.

DETAILED DESCRIPTION OF THE PREFERRED EMBODIMENTS

Reference will now be made in detail to embodiments consistent with this invention that are illustrated in the accompanying drawings. The same reference numbers in different drawings generally refer to the same or like parts.

Processing systems for network communications require several bus and processor cycles to perform a write to a system device and a read from the system device. Systems and methods consistent with the present invention provide a single instruction that directs a device to read and load data when the device is ready. In accordance with a preferred embodiment, the single instruction includes a thread identifier so that the device can send the data back to the requesting thread at the processor.

In addition, systems and methods consistent with the present invention provide for a context switch that prevents the introduction of stall cycles by using a different set of registers for a plurality of threads. In this manner, processing can switch quickly from one set of registers used by one thread to a different set of registers used by another thread. As used herein, the term thread describes a set of program instructions or a software program that relies on a context register set to perform a particular task.

Figure 1:
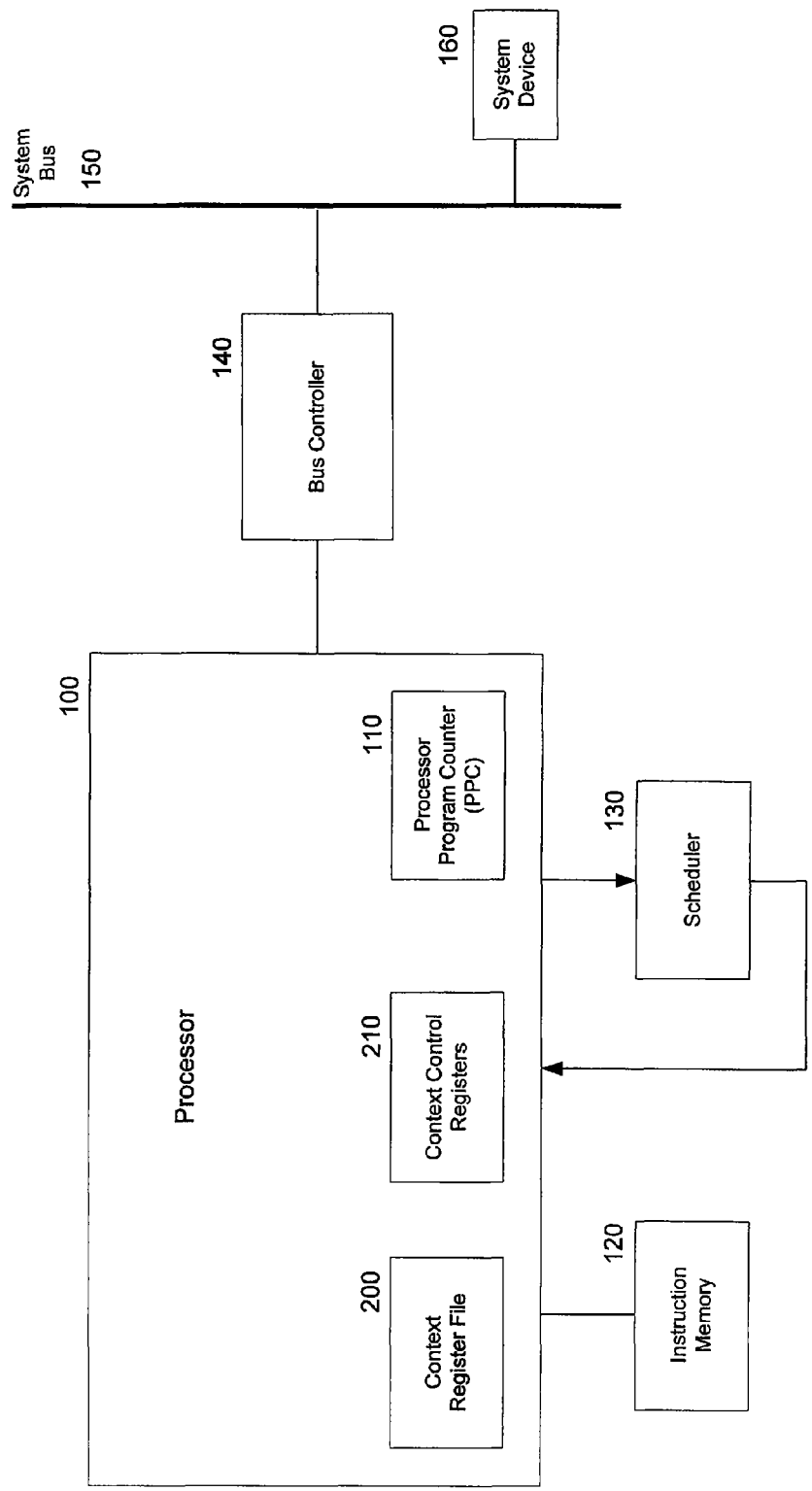
FIG. 1 is a block diagram of a processing system consistent with methods and systems of the present invention.

FIG. 1 shows an exemplary processing system that may be used in systems and methods consistent with the present invention. Processor 100 is preferably a RISC type processor that may include, among other elements, those in Lexra's LX4180 processor. In this example, processor 100 connects to instruction memory 120, which may be, for example, a cache, RAM or DRAM.

Processor 100 includes a context register file 200 and context control registers 210. As used herein, a context is an independent set of general registers in context register file 200 and control registers in context control register 210 that are used in executing a thread. As stated, a thread may be software that relies on the contents of the context registers to perform a particular task. The term context may also generally be used to refer to a thread currently using the context's registers. Processor 100 further includes a processor program counter (PPC) 110 that points to the program counter of an active context stored in a context program counter within the context control registers 210.

Processor 100 couples to scheduler 130. Scheduler 130 determines the context that should execute in the event of a context switch. This context switch optimizes the processor and bus cycles. If, for example, a current active context is awaiting data, a context switch may be performed so that another context is processed while the current context awaits the data, thereby reducing the waste of valuable processing time. In accordance with the disclosed embodiment, the current context will not be reactivated until the scheduler selects it after another context switch occurs.

Processor 100 sends commands over system bus 150 to system device 160 via bus controller 140. Bus controller 140 and system bus 150 may be similar to those used with conventional RISC processors. In systems and methods consistent with the present invention, however, bus controller 140 adds a global thread identifier (GTID) to every outgoing transaction. The GTID indicates the processor number and context number of the originating thread. System device 160 may be, for example, a table look-up unit. And, although FIG. 1 shows only one system device, one of ordinary skill in the art will recognize that multiple devices may be in communication with system bus 150.

Bus controller 140 generates command data (CMD) for each instruction, indicating whether the instruction is, for example, a read, a write, a split read, a write-twin-word split read. In this embodiment, a word consists of 32 bits and a twin word has 64 bits. Among its other tasks, bus controller 140 outputs a device address to system bus 150 along with the CMD, the GTID, and any data to be sent to the device. The device address identifies the device that will receive the command and the GTID is used by the device in returning data to a requesting processor. Again one of ordinary skill will recognize that processor 100 may include additional parts, many of which are common and whose description is unnecessary to understand the systems and methods consistent with the present invention.

Figure 2A:
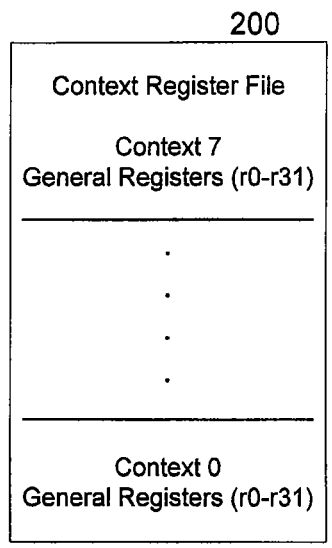
FIG. 2a shows a context register file consistent with methods and systems of the present invention.

FIG. 2a shows an exemplary context register file 200 having 8 contexts, context 7 through context 0. In this figure, each context has 32 physical general registers, but the number of contexts and the number of registers may vary depending on the complexity of the particular system, the amount of data communication on the system bus, the number of system devices present, etc.

Figure 2B:
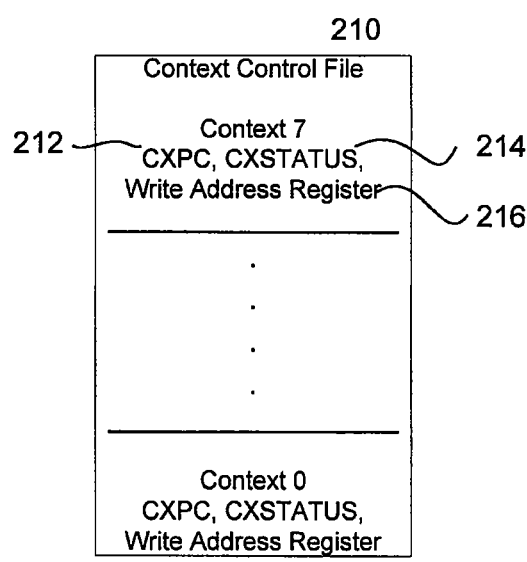
FIG. 2b shows a context control file consistent with methods and systems of the present invention.

FIG. 2b shows an exemplary context control file 210 having 3 control registers for each of the 8 contexts shown in FIG. 2a. Context control file 210 includes a context program counter (CXPC) 212 for keeping track of the next instruction to be executed in the context and a context status register (CXSTATUS) 214 having a wait load bit, which, when set, indicates that the context is awaiting data from an external device. CXSTATUS 214 may include additional status information such as an indication that the context requires external events or data to complete its task. A write address register 216, also within context control file 210, is configured to store the address of a general purpose register in an inactive context that may be awaiting data from an external device.

Figure 3:
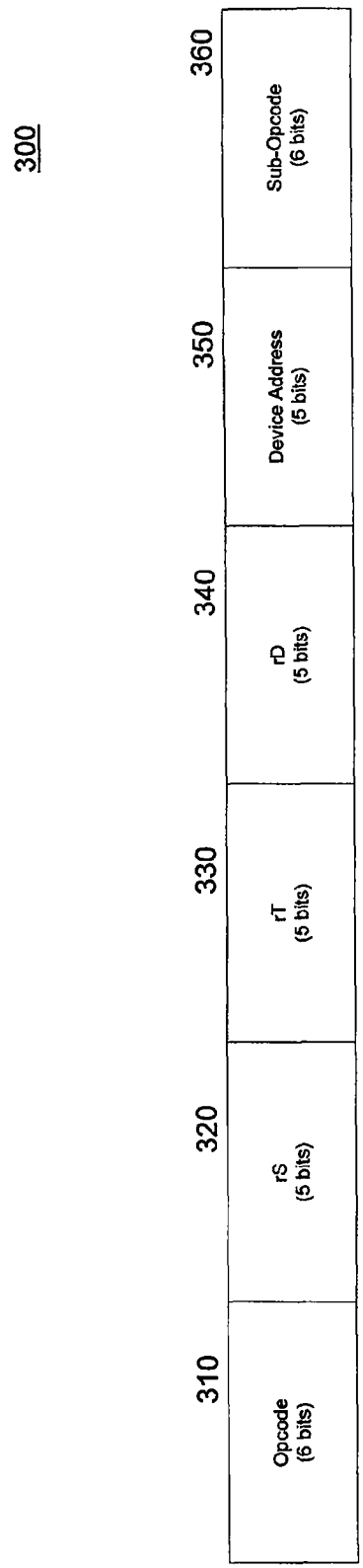
FIG. 3 shows an instruction format consistent with methods and systems of the present invention.

FIG. 3 is an exemplary representation of an instruction 300 stored in instruction memory 120. Instruction 300 includes an opcode field 310 and sub-opcode field 360 that indicate the particular operation requested. The requested operations may be commands such as read, write, and write-split read. In this example, a write-split read is an instruction that writes to a system device and directs the device to return read data when available. Instruction 300 also includes rS 320, rT 330, and rD 340; fields referring to the general purpose registers in FIG. 2a. The identified registers hold data used by the instruction or the registers that will ultimately be receiving the instruction results. In a write-split read instruction, for example, rS 320 and rT 330 identify the registers holding data that will be written to system device 160 at system device address 350. rD 340 is the identifier of the destination register, indicating the location in which the result of the load instruction should be stored. The identity of register rD may be stored in the write address register 216 so that when load data is returned, processor 100 reads the context control file 210 to determine the particular register in which to write the result.

Figure 4:
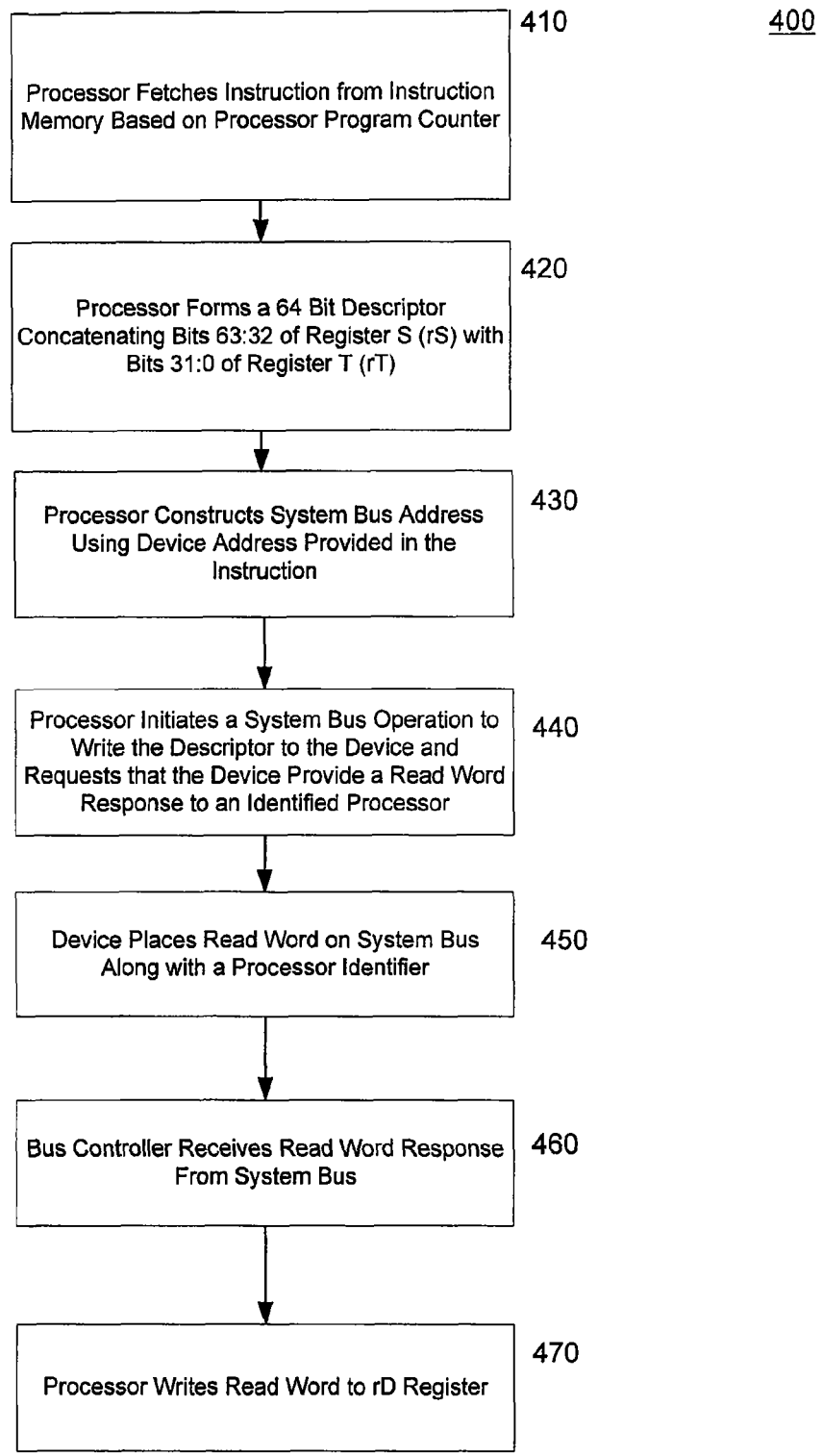
FIG. 4 is a flowchart showing the steps for processing a write descriptor load word instruction consistent with methods and systems of the present invention.

FIG. 4 shows the steps of a method 400 for processing a write-split read instruction consistent with the methods and systems of the present invention. First, processor 100 fetches instruction 300 from instruction memory 120 based on a value in PPC 110 (step 410). Processor 100 then forms a 64 bit descriptor by concatenating bits [63:32] of register S 320 and bits [31:0] of register T 330 (step 420). Processor 100 constructs a system bus address using device address 350 provided in the instruction (step 430). The actual device address is less than 32 bits, so the remaining system bus address bits are set to zero or some constant predefined value.

Following the construction of the system bus address, processor 100 initiates a system bus operation to write the descriptor to the device, having the device perform some function, and requests that the device provide a read word response back to the processor identified with a GTID (step 440). Bus controller 140 sends out instruction 300 to the device address including data, the command, and a GTID. System device 160 saves the descriptor in a memory, performs an operation using information in the descriptor, and returns the result of the operation as read data directed to the processor identified in the GTID (step 450). Bus controller 140 then receives a read word or twin word response from the system device (step 460). Finally, processor 100 writes the received data to rD register 340 (step 470) thus, completing the operation.

Figure 5:
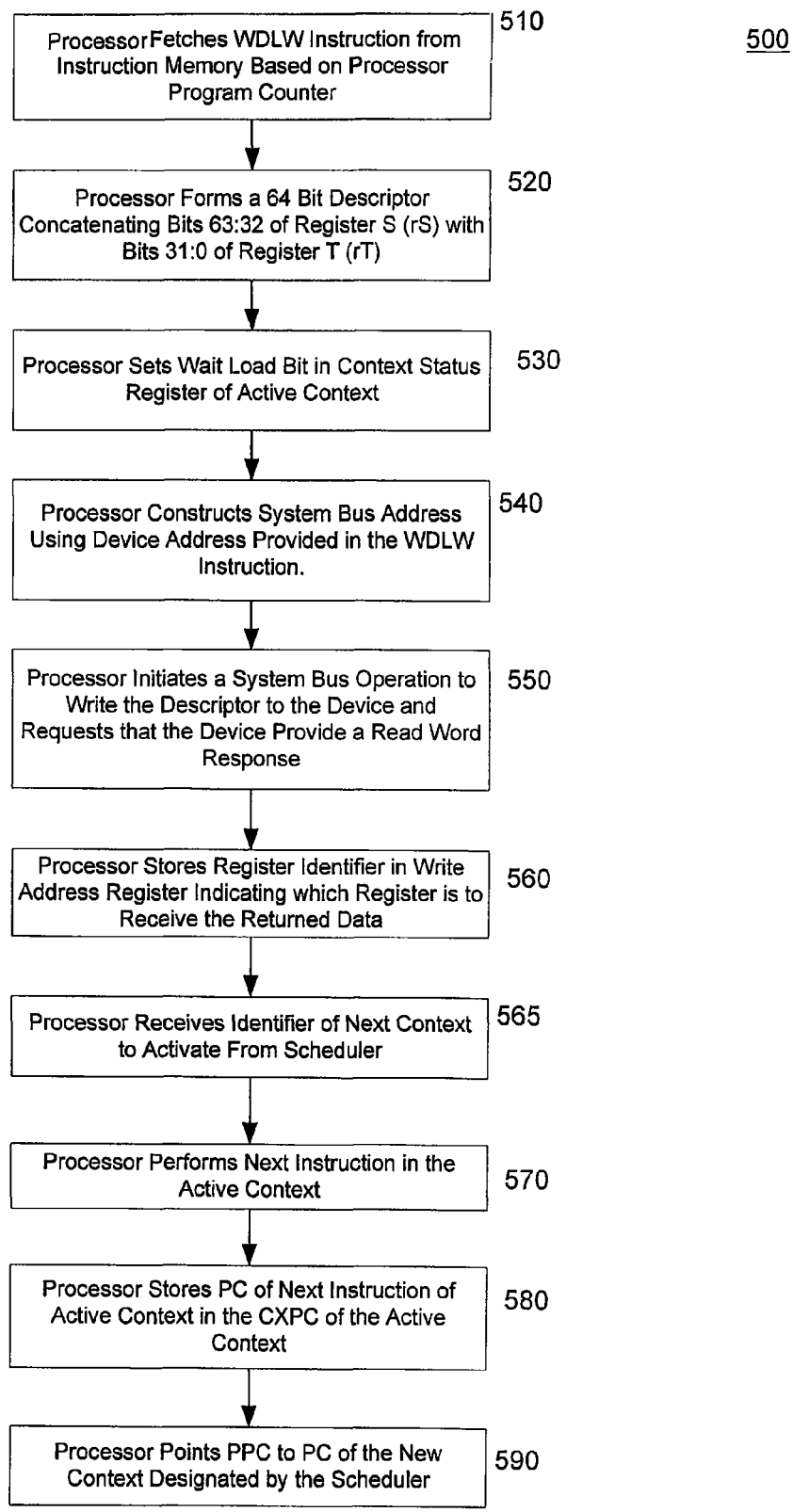
FIG. 5 is a flowchart showing the steps of a method for processing a write descriptor load word with a context switch consistent with methods and systems of the present invention.

FIG. 5 show the steps of a method 500 for processing a write descriptor load word (WDLW) instruction in accordance with systems and methods of the present invention. Referring to FIG. 5, processor 100 initially fetches instruction 300 from instruction memory 120 based on the value in PPC 110 (step 510). Using this value, processor 100 forms a 64-bit descriptor by concatenating bits [63:32] of register S 320 and bits [31:0] of register T 330 (step 520). Processor 100 next sets the wait load bit in context status register 210 of the active context (step 530). Processor 100 then constructs a system bus address using device address 350 provided in the instruction (step 540). The device address is less than 32 bits, so the remaining system bus address bits are set to zero or some constant predefined value.

Once the system bus address is constructed, processor 100 initiates a system bus operation to write the descriptor to the device and requests that the device provide a read word response (step 550). Processor 100 stores the register identified in rD 340 in write address register 216 in the active context's control file 210 indicating the register that will receive any returned data from system device 160 (step 560).

Steps 565-590 describe the steps used to perform a context switch in systems and methods consistent with the present invention. Processor 100 first receives an identifier of the next context to be activated from scheduler 130 (step 565). Processor 100 then performs the following instruction in the active context (step 570). By performing the next step in this instruction before moving on to the next context, the processor is able to execute an instruction, and is performing useful work instead of stalling for a cycle while the context switch is performed. Processor 100 then stores program counter (PC) of the next instruction in this active context in the CXPC 212 of the active context (step 580). Processor next points PPC to CXPC 212 of the new context designated by scheduler 130 (step 590).

Figure 6:
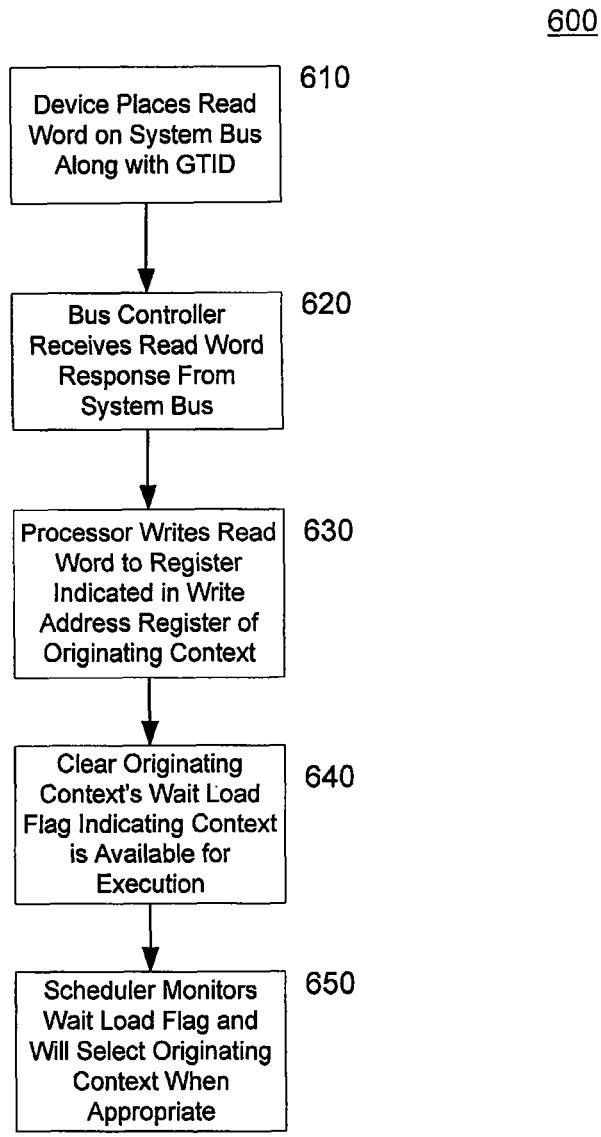
FIG. 6 is a flowchart showing the steps of a method for completing the load word for the instruction in FIG. 5.

FIG. 6 shows the remaining steps 600 for completing the load word portion of the WDLW instruction described in the method of FIG. 5. After system device 160 receives the command, data, and the GTID from system bus 150, it writes the descriptor to a memory. System device 160 then performs any requested function and loads the resulting data onto system bus 150 along with the GTID (step 610). Upon receiving the read word response from system bus 150 (step 620), bus controller 140 forwards it to processor 100. Processor 100 writes this read word to the register indicated in the write address register 216 by obtaining the identity of the originating context from the GTID (step 630). Processor 100 next clears the originating context's wait load flag in CXSTATUS register 214, indicating that the context is available for execution (step 640). Finally, scheduler 130 monitors the wait load flags of all of the contexts and will select this context when appropriate (step 650).

There are many variations that may be made consistent with the present invention. For example, in another embodiment, system device 160 returns a twin word in response to a write twin word read twin word instruction (WDLT). Further, while the implementations above specifically mention word or twin word data reads and writes, systems and methods consistent with the present invention may be used with other sized data reads and writes. In addition, there may be multiple processors sharing the system bus and accessing the system bus devices.

The foregoing description is presented for purposes of illustration and description. It is not exhaustive and does not limit the invention to the precise form disclosed. Modifications and variations are possible in light of the above teachings or may be acquired from practicing the invention. The scope of the invention is defined by the claims and their equivalents.

What is claimed is:

1. A processing system, comprising:
   a processor; and
   a controller coupled to the processor and configured to be coupled to a bus, to send an instruction to a device coupled to the bus, and to add a first identifier to the instruction to indicate an identity of the processor and an identity of a context of a thread that produced the instruction,
   wherein the device is configured and arranged to return data to the processor identified by the first identifier.

2. The processing system of claim 1, wherein the controller is further configured to produce a second identifier to indicate a function of the instruction.

3. The processing system of claim 2, wherein the function is one of a read function, a write function, a split read function, and a write-twin-word split read function.

4. The processing system of claim 2, wherein the controller is further configured to produce an address for the device.

5. The processing system of claim 4, wherein the address identifies the device that is to receive the instruction.

6. A method for executing an instruction, comprising:
   transmitting, from an electronic processor to an external electronic device, a command identified at a first field of the instruction, a descriptor, and an identifier to indicate an identity of the electronic processor and an identity of a context of a thread that produced the instruction; and
   receiving from the external electronic device and saving, at the electronic processor at a first register identified at a second field of the instruction, a result of an operation performed at the external device using information in the descriptor,
   wherein the identifier is used by the external device to identify the electronic processor to which to return the result.

7. The method of claim 6, wherein the descriptor is formed by concatenating, at the electronic processor, a most significant bits portion of a second register identified at a third field of the instruction and a least significant bits portion of a third register identified at a fourth field of the instruction.

8. The method of claim 6, wherein the transmitting further comprises using, at an electronic controller, a bus address of the external electronic device to transmit the command, the descriptor, and the identifier.

9. The method of claim 8, wherein the bus address is constructed, at the electronic processor, from an address of the external electronic device stored at a third field of the instruction.

10. The method of claim 6, further comprising:
    receiving, at an electronic controller, the result from the external electronic device.

11. The method of claim 10, wherein the receiving further comprises using, at the electronic controller, the identifier to receive the result from the external electronic device.

12. A system for executing an instruction, comprising:
    an electronic processor configured to transmit, to an external electronic device, a command identified at a first field of the instruction, a descriptor, and an identifier to indicate an identity of the electronic processor and an identity of a context of a thread that produced the instruction, and configured to save, at a first register identified at a second field of the instruction, a result of an operation performed at the external device using information in the descriptor; and an electronic controller configured to use a bus address of the external electronic device to transmit, from the electronic processor to the external electronic device, the command, the descriptor, and the identifier, and configured to receive the result from the external electronic device, wherein the external electronic device is configured and arranged to return data to the processor identified by the identifier.

13. The system of claim 12, wherein the electronic processor is further configured to concatenate a most significant bits portion of a second register identified at a third field of the instruction and a least significant bits portion of a third register identified at a fourth field of the instruction to form the descriptor.

14. The system of claim 12, wherein the electronic processor is further configured to construct the bus address from an address of the external electronic device stored at a third field of the instruction.

15. The system of claim 12, wherein the electronic controller is further configured to use the identifier to receive the result from the external electronic device.

16. A method for executing an instruction, comprising:
receiving, at an electronic device, a command identified at a first field of the instruction, a descriptor, and an identifier to indicate an identity of an external electronic processor and an identity of a context of a thread that produced the instruction;

performing, at the electronic device, an operation using information in the descriptor to produce a result; and conveying, from the electronic device to the external electronic processor, the result, wherein the electronic device is, configured and arranged to convey the result to the external electronic processor identified by the identifier.

17. The method of claim 16, wherein the descriptor is formed by concatenating, at the external electronic processor, a most significant bits portion of a first register identified at a second field of the instruction and a least significant bits portion of a second register identified at a third field of the instruction.

18. The method of claim 16, wherein the receiving further comprises using a bus address of the electronic device to receive the command, the descriptor, and the identifier.

19. The method of claim 18, wherein the bus address is constructed, at the external electronic processor, from an address of the electronic device stored at a second field of the instruction.

20. The method of claim 16, wherein the conveying further comprises using the identifier to convey the result.

21. An electronic device for executing an instruction, comprising:
a memory configured to store a descriptor;

an internal electronic processor configured to perform an operation using information in the descriptor to produce a result; and a port configured to receive a command identified at a first field of the instruction, the descriptor, and an identifier to indicate an identity of an external electronic processor and an identity of a context of a thread that produced the instruction, and configured to convey the result to the external electronic processor, wherein the electronic device is configured and arranged to convey the result to the external electronic processor identified by the identifier.

22. The electronic device of claim 21, wherein the descriptor is formed by concatenating, at the external electronic processor, a most significant bits portion of a first register identified at a second field of the instruction and a least significant bits portion of a second register identified at a third field of the instruction.

23. The electronic device of claim 21, wherein the internal electronic processor is further configured to use a bus address of the electronic device to receive the command, the descriptor, and the identifier.

24. The electronic device of claim 23, wherein the bus address is constructed, at the external electronic processor, from an address of the electronic device stored at a second field of the instruction.

25. The electronic device of claim 21, wherein the internal electronic processor is further configured to use the identifier to convey the result.

* * * * *